United States Patent [19]

Appel

[11] Patent Number: 4,978,185
[45] Date of Patent: Dec. 18, 1990

[54] RASTER SCANNING SYSTEM UTILIZING OVERFILLED POLYGON FACET DESIGN WITH NON-REFLECTIVE FACET EDGES

[75] Inventor: James J. Appel, Brighton, N.Y.

[73] Assignee: Xerox Corporation, Stamford, Conn.

[21] Appl. No.: 426,350

[22] Filed: Oct. 25, 1989

[51] Int. Cl.⁵ .................. G02B 26/08; H04N 3/08
[52] U.S. Cl. ............................ 350/6.8; 350/6.7; 358/206
[58] Field of Search ............... 350/6.1–6.91, 350/627, 486, 487, 320; 358/206, 300, 302

[56] References Cited

U.S. PATENT DOCUMENTS

| | | | |
|---|---|---|---|
| 3,944,323 | 3/1976 | Starkweather | 350/6.8 |
| 4,245,894 | 1/1981 | Luchtenberg | 350/627 |
| 4,277,141 | 7/1981 | Kleiber | 350/320 |
| 4,357,071 | 11/1982 | Mankel et al. | 350/6.8 |
| 4,519,680 | 5/1985 | Grollimond | 350/6.5 |
| 4,790,639 | 12/1988 | Baumgarten et al. | 350/6.9 |
| 4,884,856 | 12/1989 | Takeyasu et al. | 350/320 |
| 4,902,085 | 2/1990 | Hurakoshi et al. | 350/6.8 |

Primary Examiner—Rodney B. Bovernick
Assistant Examiner—Thong Nguyen

[57] ABSTRACT

An overfilled polygon scanning system is implemented by first determining which portions of the polygon facet can be formed with a degree of flatness within specification. Typically, the flatness goes increasingly out of specification to the facet edges, causing stray light and subsequent reduction in contrast in a subsequent exposure at a photoreceptor image plane. Once the areas of the outside specification portions are determined, these areas which constitute the oversized portion of the polygon are coated with a non-reflective material. This coating eliminates light reflected from these areas and assures that the light is reflected only along the non-coated (within specification) portion of each facet.

2 Claims, 2 Drawing Sheets

RASTER SCANNING SYSTEM UTILIZING OVERFILLED POLYGON FACET DESIGN WITH NON-REFLECTIVE FACET EDGES

BACKGROUND AND INFORMATION DISCLOSURE STATEMENT

This invention relates to a raster scanning system and, more particularly, to a scanning system utilizing a rotating polygon whose facets are illuminated in an overfilled design and whose edges are coated with a non-reflective coating.

Many prior art raster output scanners (ROS) utilize a rotating polygon having flat reflective surfaces, or facets, in parellel with the axis of rotation of the polygon. In a typical system, a beam is emitted from a light source such as a helium-neon laser. The light is directed through a pre-polygon conditioning optics, modulated according to an input electrical signal, onto the rotation polygon surfaces. The high speed rotation of the polygon, typically in a 3 to 15 krpm range, then scans the beam through a post-polygon conditioning lens and images the laser spot across the full process width of a photosensitive image plane. In these prior art ROS systems, the pre-polygon conditioning optics typically are incorporated in an underfilled facet design; e.g., the light beam directed against the rotating polygon illuminates only a portion of each rotating surface (facet). Overfilled facet designs, where the light beam completely illuminates each facet and a small portion of adjacent facets, have been used to some degree, but have not gained wide acceptance. Comparing the two designs, in an overfilled design the facet size required to produce a given spot size at the image plane is greatly reduced allowing many more facets to be accommodated on the same diameter polygon. This, in turn, permits the scan system to operate it at a relatively low rotation rate permitting the use of less powerful (and less expensive) polygon motor drives. This advantage has, heretofore, been more than offset, by two factors: low throughput efficiency and non-uniform illumination at the polygon facets. In order to tolerate the low efficiency (typically 10 to 15 %), a higher powered laser diode is required. The non-uniformity problem occurs because the light beam directed across the rotating polygon has a Gaussian spot shape which has been expanded so that more than one facet of the polygon is illuminated. As the polygon rotates to scan the spot across an output medium, the amount of light reflected to the medium varies because the facets are sampling different parts of the Gaussian illumination profile and the effective area of the polygon is changing.

Attempts to compensate for this illumination uniformity have taken several forms. One method is to change the spot intensity with scan angle by using a smile correction algorithm which changes the output of the laser diode to maintain uniform exposure at the photoreceptor image plane. Another method, disclosed in co-pending U.S. application Ser. No. 359,604, now U.S. Pat. No. 4,941,721 filed on Jun. 1, 1989, is to introduce an aspherical lens system between the laser source and the rotating polygon. The aspheric lens transforms the non-uniform Gausian light beam profile into a colliminated flat intensity beam directed across the width of the polygon facets, the beam overfilling each facet. With either of these two methods, however, there still remains a residual non-uniformity problem which is inherent in the basic design of any polygon scanner. The mirrored surfaces (facets) are manufactured with a high degree of flatness precision. Typically ¼ wavelength of light is the tolerance, but the facets cannot be held to this tolerance at the facet edges. Any deviation from the flatness specification near the corner edges of each facet will result in a degradation of the spot imaged at the photoreceptor. The amount of degradation of the spot depends upon the magnitude of departure from flatness and the areas of the facet over which the departure exists.

According to the present invention this facet edge non-uniformity is compensated for by operating in an overfilled design mode and by having the edges between the facets of the polygon coated with a non-reflective coating to eliminate light reflected from the out-of-spec flat edge areas. More particularly the invention relates to a raster scanning system utilizng an overfilled polygon facet design for forming latent images at a photosensitive medium comprising: means for providing a beam of radiant energy, means for modulating said energy beam in response to electrical signals, means for expanding the modulated beam, and a polygon having at least one reflective facet positioned in the optical path of said modulated beam and adapted to scan said spot across said medium, each of said facets characterized by having two corner edges coated with a non-reflective material.

Some relevant prior art disclosures are found in the following patents: U.S. Pat. No. 3,944,323 to Starkweather, assigned to Xerox Corporation, discloses a variable spot size scanning system. A means is provided for covering a portion of the lower half of the facets. This system is intended to provide a more continuous gray scale for a scanner.

U.S. Pat. No. 4,357,071 to Mankel et al. discloses an optical fault seeking apparatus. A polygon mirror is shaped with flat facets and concave corners. The apparatus is used for scanning fabrics for faults in workmanship.

DETAILED DESCRIPTION OF THE INVENTION

Figure 1:
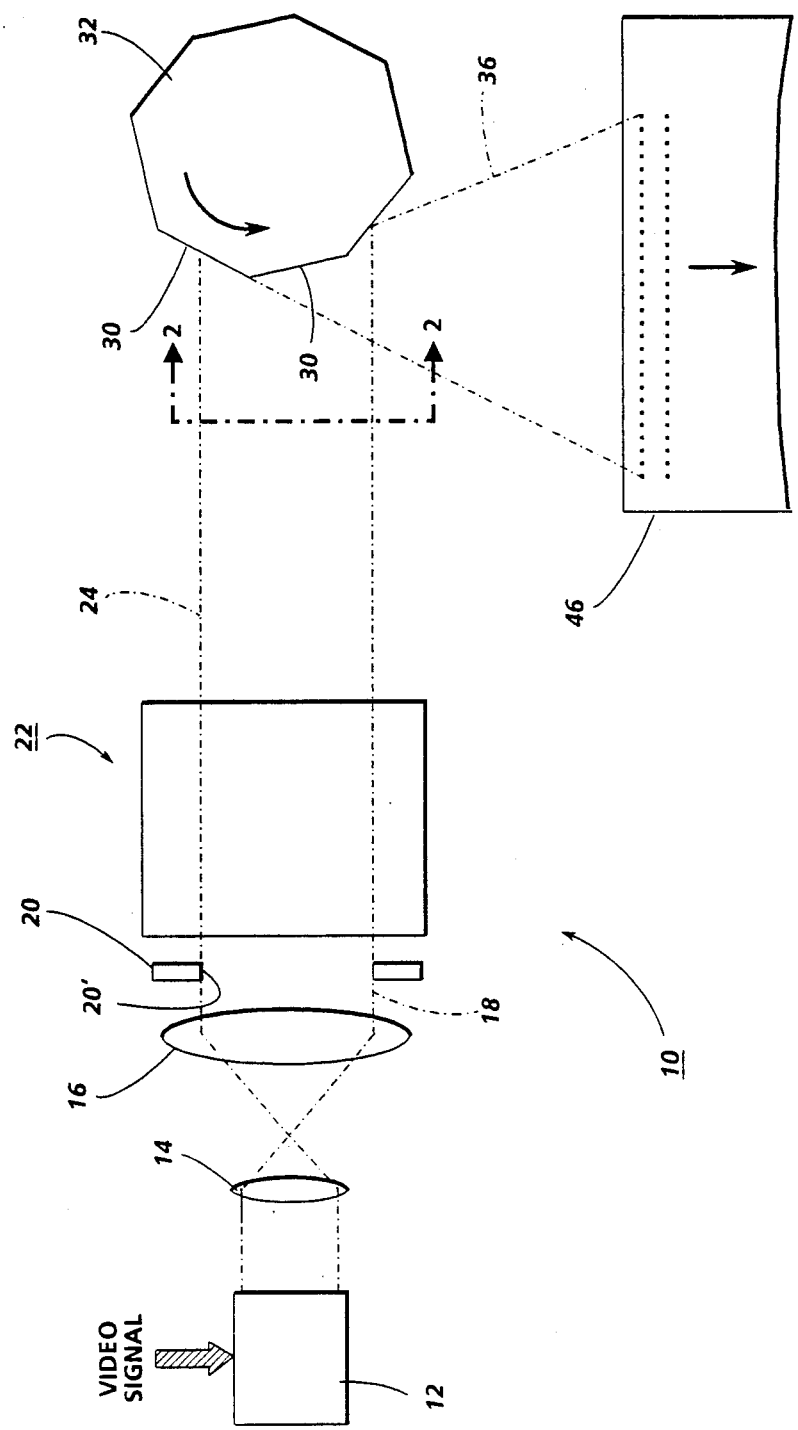
FIG. 1 is a schematic bottom plan view of a polygon ROS system operating in an overfilled facet design, and including a preferred embodiment of the polygon of the present invention.
Figure 2:
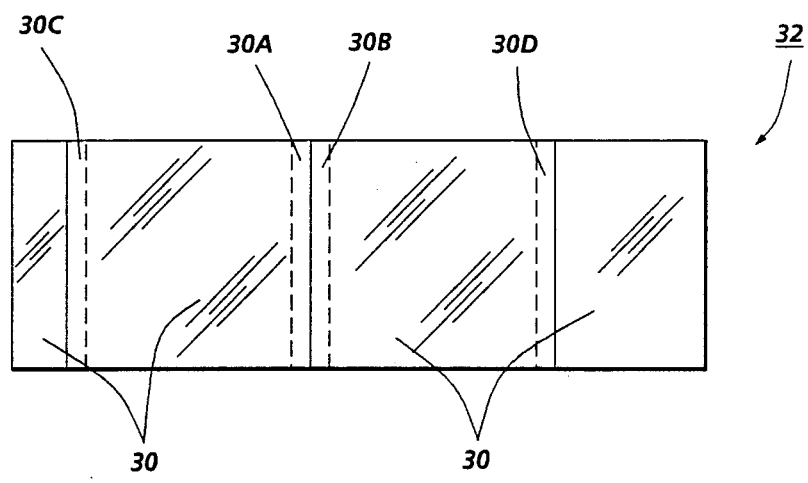
FIG. 2 shows a front edge view, 2—2, of a portion of the polygon of FIG. 1 showing edge corner strips coated with a non-reflective coating.
Figure 3:
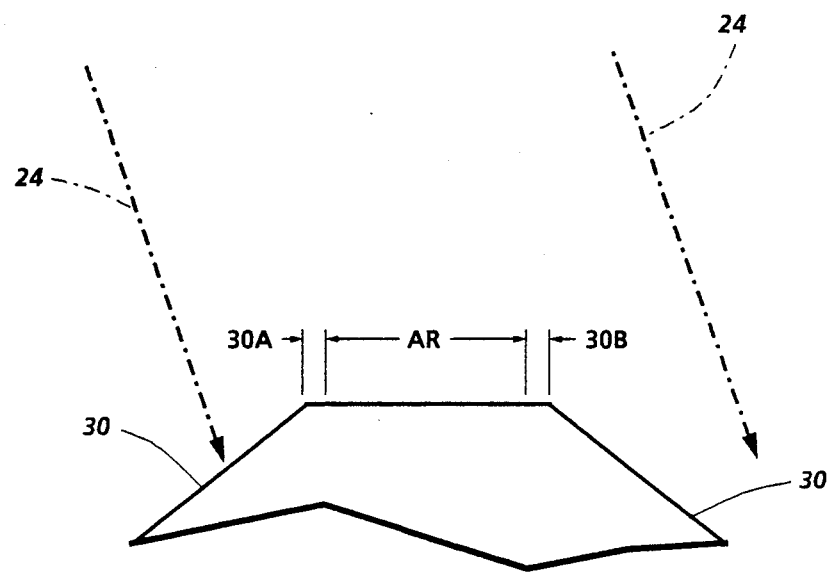
FIG. 3 shows an illumination profile for an overfilled polygon facet used to determine facet areas to be coated.

Referring of FIG. 1 of the drawings, there is shown a ROS system 10 of the type having an overfilled polygon facet design. As shown, a laser diode 12 serves as the source of high intensity radiation. The laser diode 12 is self-modulating and the output beam of light is modulated in conformance with the information contained in a video signal. The output of diode 12, in a preferred embodiment, varies in response to a smile correction algorithm in the input video signal. The modulated beam is expanded by the two lens beam expanders 14, 16 following which the expanded beam of light 18 passes through a line-like aperture or slit 20' formed by aperture plate 20. The beam 18 passes through pre-polygon system 22. Lens system 22 focuses the beam 18 to a controlled energy distribution beam 24 which is reflected from mirrored facets 30 of rotating polygon scanning 32. Facets 30 of polygon 32 are mirrored surfaces having a flatness within ¼ wavelength of light tolerance save for a narrow strip adjacent each edge. As shown in FIG. 2, edge strips 30A through 30D at the corner edges of each of the illustrated facets are coated with a non-reflective coating such as Sikken's TM epoxy top coat, black #463-3-8. Additional coated edge strips (not shown) are formed adjacent additional edges of the facets 30 shown in FIG. 1. The width of the edge strips is determined during polygon design by directing an incident beam 24, as shown in FIG. 3, to the polygon surface. Each facet 30 has an area AR which has a flatness within the required specification, while areas 30A, 30B, 30C, 30D are outside the required flatness. Each facet is thus designed to be oversized by the width of the edge strips. It is these strips which are rotated into the brightest part of the scan. A typical width for each edge strip is between 0.1 mm and 0.5 mm. The polygon design is then completed with facets 30 oversized by the sum of the two edge strip widths. The edge strips are coated, prior to polygon balancing, with the above-identified non-reflective coating to eliminate light which would be reflected from this area. The coating was applied using a catalyst solution or converter and a thinner (three parts of paint to one of converter and thinner). The area was masked to define the areas to be painted, and an air brush was used to apply the paint.

With the rotation of polygon 32 in the direction indicated by the arrow (FIG. 1), light beam 36 is reflected from each illuminated facet 30 and passes through a series of post-polygon lenses (not shown, but conventional in the art) which image the beam 36 across the full process width at a photosensitive image plane 46. The beam 36 strikes the image plane with a uniform intensity.

While the invention has been described with reference to the structure disclosed, it is not confined to the details set forth, but is intended to cover such modifications or changes as may come within the scope of the following claims.

I claim:

1. A raster scanning system utilizing a plurality of overfilled polygon facets for forming latent images at a photosensitive medium comprising:

a laser light source for providing a modulated output light beam, said output light beam directed along an optical path which extends from the light source to said photosensitive medium;

means for expanding the modulated beam;

means for focusing the expanded modulated beam to a controlled energy distribution beam; and a polygon having at least one reflective facet positioned in the optical path of said modulated beam and adapted to scan said beam across said medium, each of said facets characterized by having a vertical strip adjacent each edge, said strip extending the full height of the facet, each strip coated with a non-reflective material.

2. The scanning system of claim 1, wherein said coated strips each have a width of between 0.1 and 0.5 mm.

* * * * *